United States Patent [19]
Yates

[11] Patent Number: 6,074,001
[45] Date of Patent: Jun. 13, 2000

[54] BICYCLE SADDLE

[76] Inventor: Paul M. Yates, 5814 Briar Tree Dr., LaCanada, Calif. 91011

[21] Appl. No.: 09/137,986

[22] Filed: Aug. 21, 1998

[51] Int. Cl.⁷ ........................................................ B62J 1/00
[52] U.S. Cl. .................................... 297/195.1; 297/215.16
[58] Field of Search .................................. 156/212, 214; 297/214, 215.16, 195.1

[56] References Cited

U.S. PATENT DOCUMENTS

| | | | |
|---|---|---|---|
| 2,314,046 | 3/1943 | Kalter | 297/214 |
| 3,997,214 | 12/1976 | Jacobs | 297/214 |
| 4,999,068 | 3/1991 | Chiarella | 297/214 X |
| 5,388,887 | 2/1995 | Read | 297/195.1 |
| 5,397,162 | 3/1995 | Huang | 297/195.1 |

*Primary Examiner*—Jeff H. Aftergut
*Attorney, Agent, or Firm*—Walter A. Hackler

[57] ABSTRACT

A bicycle saddle is produced through the steps of providing a fabric/film having a selected perimeter contour and disposing the fabric/film into a mold with the fabric/film perimeter surrounding a mold cavity, the cavity having a bicycle saddle contour. A gelable polymer is disposed into the mold cavity and onto the fabric/film and the fabric/film is conformed to the mold cavity to form a shaped elastomer adhering to the fabric/film in order to permanently contour the fabric/film in the shape of the bicycle saddle contour. A bicycle saddle shell is heated to a temperature sufficient to bond the shell to the shaped elastomer and pressed onto the shaped elastomer to bond the shaped elastomer to the top surface of the shell.

15 Claims, 4 Drawing Sheets

BICYCLE SADDLE

The present invention is generally directed to the field of saddles or seats for bicycles and the like and is more particularly directed to a method for inexpensive manufacture of a bicycle saddle and a saddle produced by such method.

Heretofore, bicycle saddles have been made with labor intensive procedures. For example, a saddle frame or shell is typically hand covered with a cushion which is thereafter covered by a fabric/film material. The fabric/film material is typically hand sewn and machine stitched or stapled to an underside of the shell and thereafter various designs or logos applied to the fabric.

Alternatively, logos and scuff resistant pads may be hand sewn or applied to the fabric/film before it is conformed to the cushion and shell to produce a finished bicycle saddle, or the like.

Clearly, these operations entail a great number of labor intensive procedures. Accordingly, the manufacture of the many saddles has been transferred to overseas plants in which labor costs are significantly lower.

In order to provide effective cushioning, many saddles have utilized elastomeric materials which are soft, elastic and have viscoelastic properties.

Such elastomeric cushions, however, have an inherent problem with regard to limited compressibility and, accordingly, do not permit the cushioned seat to provide deep compression for the rider which provides a shock absorbency and overall comfort to the rider.

The present invention incorporates an elastomeric cushion in the manufacture of a bicycle saddle which is accomplished through non-labor intensive methods. In other words, the present invention, because of the elimination of manual labor intensive steps, provides for the manufacture of a bicycle saddle or the like, in an inexpensive manner. Further, all of the advantages of a hand assembled saddle are provided by the method of the present invention in the production of a bicycle saddle. In addition, the elastomeric in the present invention is formed with sealed air columns to accommodate deep compression and scuff pads for abrasion resistance.

SUMMARY OF THE INVENTION

The bicycle saddle in accordance with the present invention is produced by the steps of providing a fabric or film having a selected perimeter contour and disposing the fabric/film mold with the fabric/film perimeter surrounding a mold cavity. The cavity has a bicycle saddle contour.

A gelable polymer is disposed into the mold cavity and onto the fabric and thereafter the fabric/film may be contoured to the mold cavity using a fixture while heating the polymer to form a shaped elastomer which adheres to the fabric/film in order to permanently contour the fabric/film in the shape of a bicycle saddle contour.

Preferably, in order to further reduce production costs, after the fabric/film is disposed into the mold, hot polymer elastomer is injected thereon in order to conform the fabric/film to the mold. Upon cooling, the shaped elastomer maintains the fabric/film in conformance with the imparted mold contour.

In one embodiment of the present invention, a bicycle saddle shell is provided and a top surface of the shell may be heated to a temperature sufficient to bond the shell to the shaped elastomer. The heated shell is pressed onto the shaped elastomer to bond the elastomer to the top surface of the elastomer.

More particularly, the shell perimeter may be heated along with proximate undersurface area and the fabric/film perimeter may be folded over the shell perimeter in order to bond the fabric/film perimeter to the shell underside. In this manner, no sewing, stitching, stapling or other further labor intensive activity is required to complete the bicycle saddle. This step may be utilized with or without heating of the shell.

In order to enhance the cushioning capability of the elastomer and, in fact, provide a saddle having various cushioning properties throughout the saddle surface, a plurality of spaced apart open ended cavities may be formed in the shaped elastomer. Thereafter, the open ended cavities may be sealed by the shell being bonded thereto.

As hereinabove noted, the cushioning characteristics of the saddle are provided by forming a plurality of cavities having different depths in order to provide greater cushioning of the saddle in selected areas. In addition, or alternative thereto, the cavities in the shaped gel may have a selected spaced apart relationship in order to control the cushioning properties of the saddle. In addition, foam may be disposed in the cavities in order to tailor the resilient characteristics of the cushion.

In addition to the hereinabove recited steps or independence thereof, in order to provide scuff resistance surfaces on the fabric/film, urethane film, or other suitable plastic film, may be provided with a selected cutout portion therein which is heat sealed to one side of the fabric/film for disposing the fabric/film into the mold with the urethane film facing the mold cavity. Subsequently inverted, the urethane film covers portions of the fabric/film particularly the tail and horn portions in order to provide scuff and abrasion resistant to these prominent areas of the saddle after application of the fabric/film to the shell.

Additionally, logos, or printed photographs, may be affixed to the saddle by disposing such items over the first plastic film before heat sealing a second plastic film thereto. These steps are formed prior to placement of the fabric/film into the mold and result in decorative images which are displayed on the saddle without the separate labor intensive steps of sewing logos, or applying decals or the like to the fabric.

BRIEF DESCRIPTION OF THE DRAWINGS

The advantages and features of the present invention will appear from the following description when considered in conjunction with the accompanying drawings, in which.

DETAILED DESCRIPTION

Figure 1:
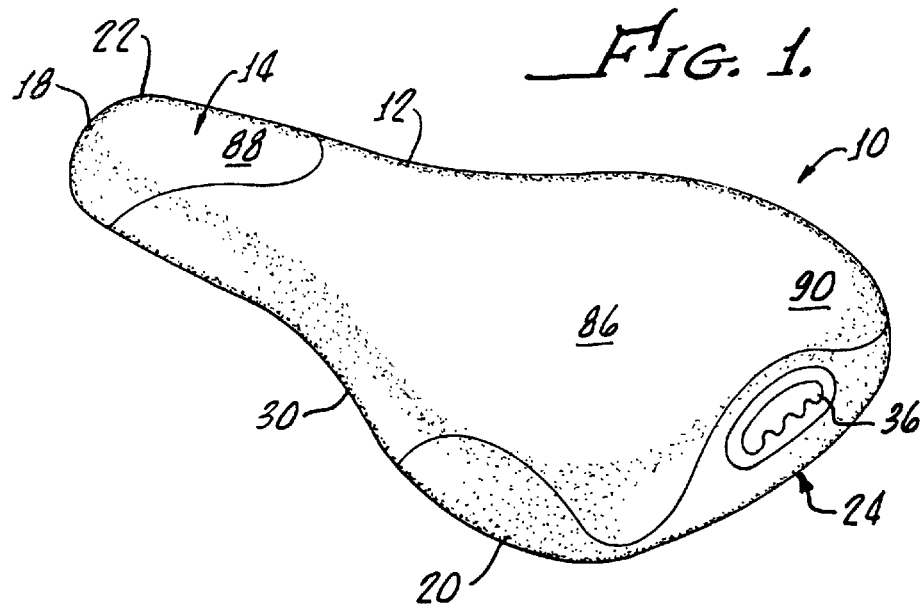
FIG. 1 is a perspective view of a bicycle saddle made in accordance with the present invention.

With reference to FIG. 1, there is shown a bicycle saddle 10 produced in accordance with the method of the present invention generally showing a fabric/film 12, and, in accordance with one embodiment of the present invention, the fabric/film 12 may be overlaid with a plastic film 14 to provide scuff pads 18, 20 over horn 22 and tail 24 portions of the saddle 10, as will be hereinafter described in greater detail.

Figure 2:
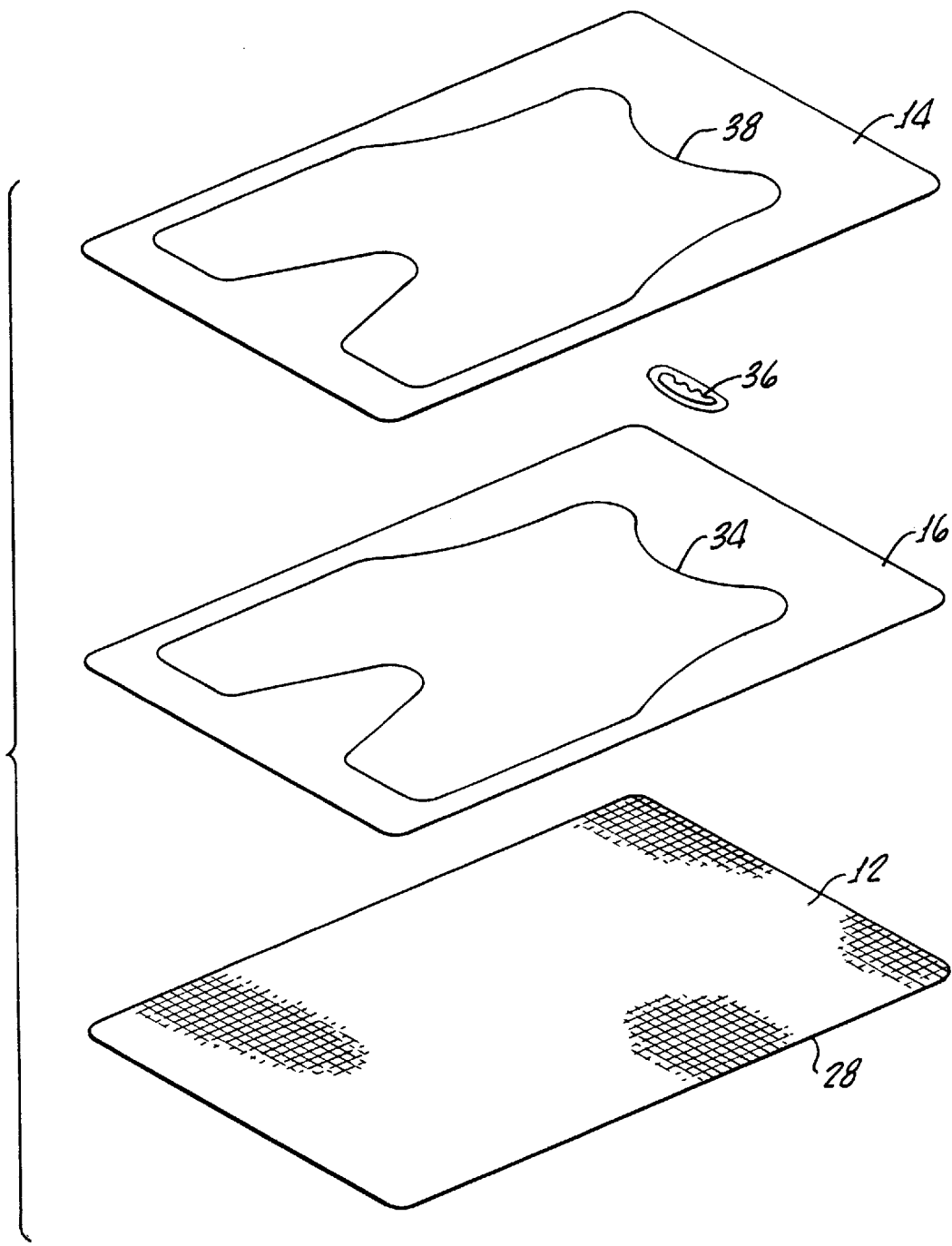
FIG. 2 is an exploded view of fabric/film utilized in accordance with the present invention showing a layered configuration and accordingly an order of assembly thereof.
Figure 8:
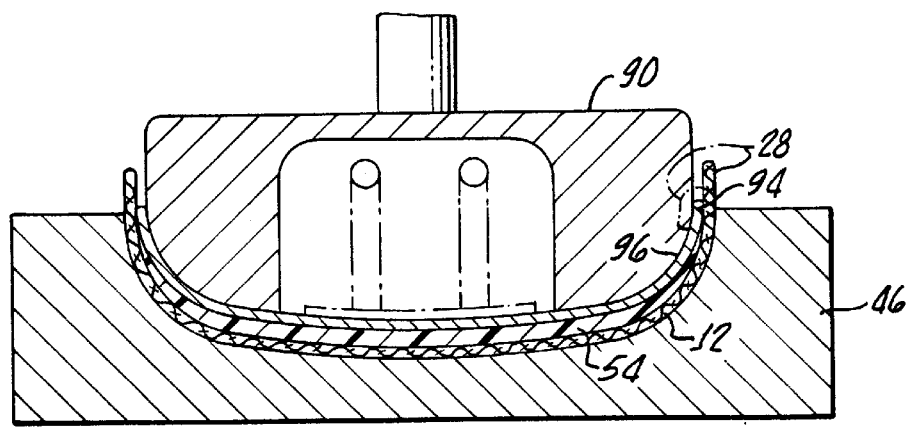
FIG. 8 is a cross sectional view of the mold shown in FIG. 7 showing the saddle shell being adhered to the shaped elastomer and fabric/film, edges of the fabric/film may be bonded to an underside of the shell by a separate figure or folded over the shell while it is contacted with the shaped elastomer.

The fabric/film may be of any suitable fabric such as Lycra®, a plastic material, having a selected perimeter 28. (See FIG. 2). It should be appreciated that the perimeter shown in FIG. 8 is shown in a rectangular format for simplicity. In fact, this perimeter 28 may be trimmed subsequent to forming, or, may be precut in order to conform to a perimeter 30 of the saddle 10 (see FIG. 1).

Turning again to FIG. 2, the fabric/film 12 may be overlaid by a plastic, for example, urethane film 16 having a cutout 34 therein which is heat sealed to the fabric/film 12.

A printed image or logo 36 may then be placed onto the film 16 and covered with a transparent plastic film, for example, urethane, film 14 having a similar cutout 38. Thereafter, the plastic films 14, 16 are heat sealed to the fabric/film with the logo 36 therebetween. It should be appreciated that the assembly of the fabric/film 12 and urethane film layers 14, 16 with the logo 36 therebetween may be assembled before they are heat sealed together.

Heat sealing may be done in any conventional manner using a flat plate press (not shown), as is well known in the art. The plastic film may be of any suitable urethane or polyurethane with a thickness of between about 0.001 inches to about 0.05 inches, depending upon the desired stiffness and texture desired in the scuff pads 18, 20.

A thinner urethane film produces less abrasive resistance in the scuff pads 18, 20, however, enables a color shading on the fabric/film 12 for decorative purposes on the saddle 10. Thicker urethane film provide more durable abrasion resistance for the scuff pads 18, 20 and also more color contrast distinction between the abrasion resistant areas 22 and the first fabric/film 12.

Figure 3:
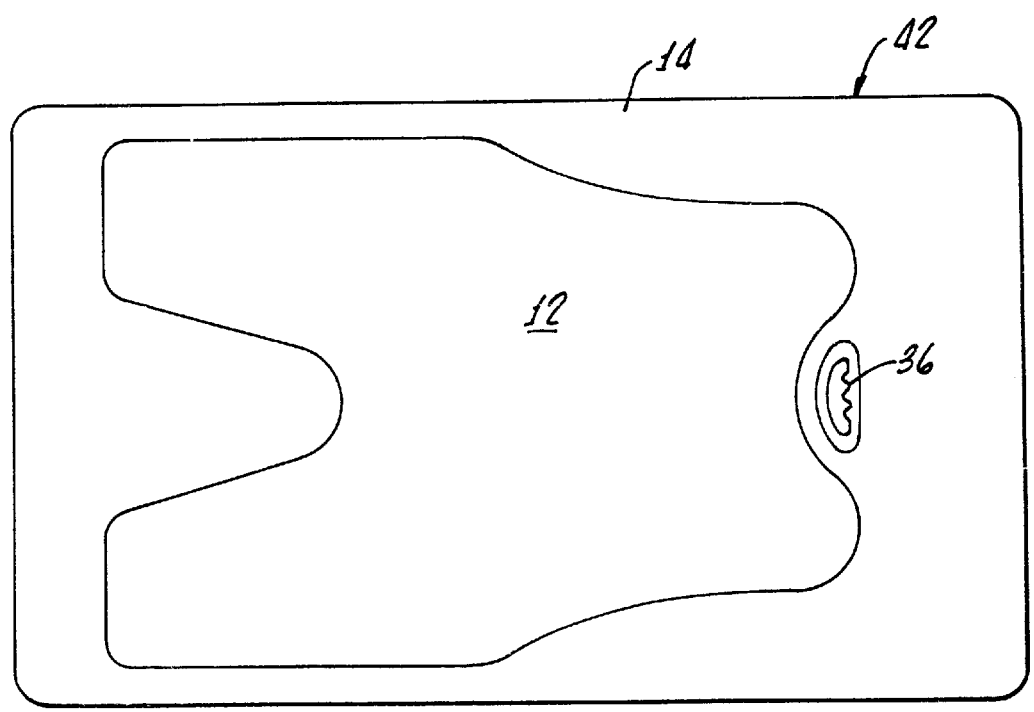
FIG. 3 is a planned view of the fabric/film and films shown in FIG. 2.

It should also be appreciated that the urethane layers 14, 16 may be of different thicknesses depending upon the transparency for the logo 36 desired and various color contrasts which are available by various combinations. The resulting flat fabric/film 12 with the urethane 16 and logo 36 thereon is illustrated in FIG. 3 as a flat sheet 42. Thereafter, the fabric/film may be wrapped over a saddle shell (not shown in FIG. 2) in a conventional manner.

Figure 4:
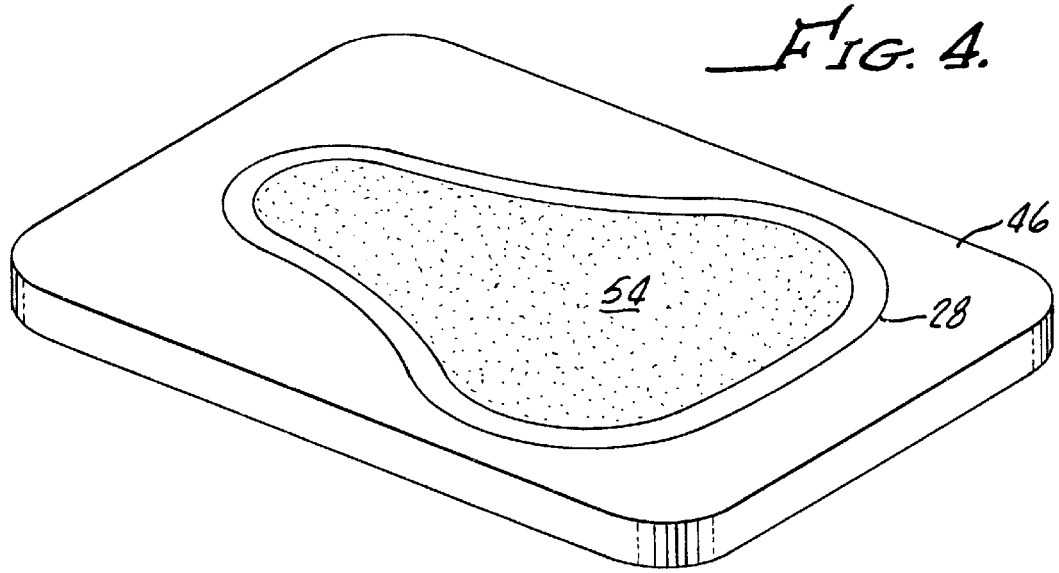
FIG. 4 is a perspective view of the fabric/film shown in FIG. 3 as it may be inverted and covered with a gelable polymer.
Figure 5:
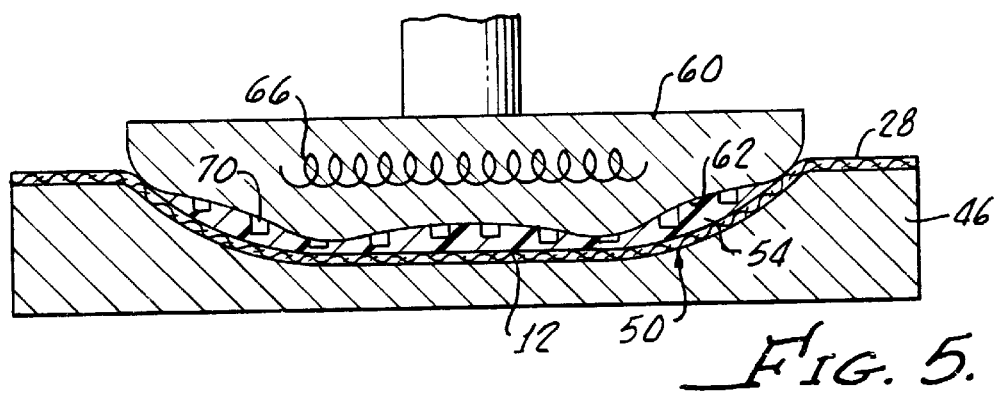
FIG. 5 is a cross sectional view of the fabric/film shown in FIG. 4 as disposed in a mold in accordance with one embodiment of the present invention and conformed thereto by a heated fixture having pins thereon for providing cavities in a shaped elastomer adhering to the fabric.
Figure 6:
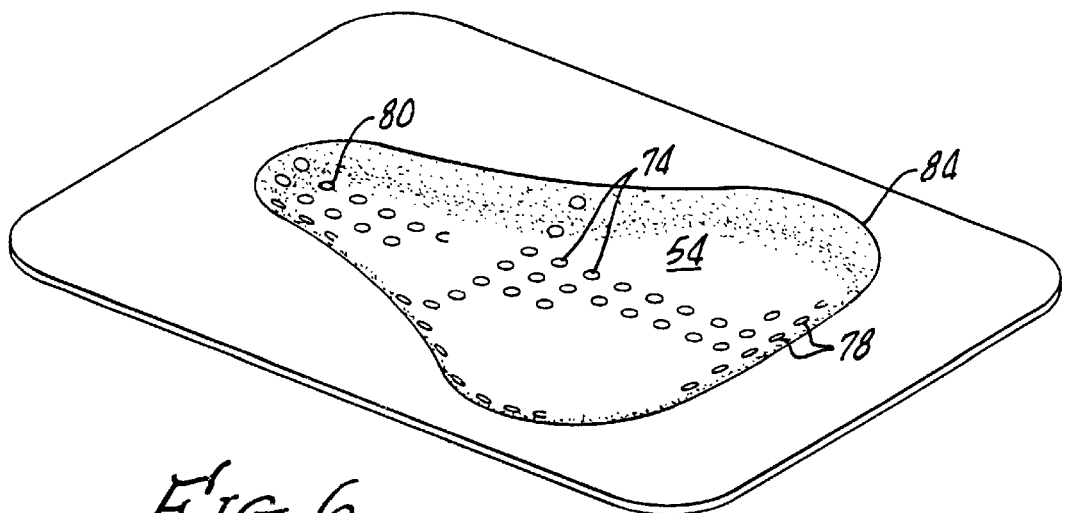
FIG. 6 is a perspective view similar to FIG. 4 showing the fabric/film with a shaped elastomer thereon having a plurality of cavities for controlling the cushioning effect of the elastomer.

With reference to FIG. 4, this flat sheet 42 is inverted and disposed in a mold 46 with the fabric/film perimeter 28, which may have been already trimmed, surrounding a mold cavity 50 as more clearly shown in FIG. 5.

A gelable elastomer polymer 54 is disposed into the mold cavity 50 and onto the fabric/film 12 and thereafter the fabric/film 12 is conformed to the mold cavity utilizing a fixture 60 having a contoured face 62. A copolymer 54 is heated, for example, by a coil 66 and a fixture 60, or in any other conventional manner, in order to form a shaped elastomer adhering to the fabric/film and because of such adherence, permanently contour the fabric/film 12 in the shape of the bicycle saddle contour.

The gelable polymer 34 may be of any suitable type such as, for example, set forth in U.S. Pat. No. 5,633,286, which is incorporated into the present application by this specific reference thereto, for describing the types of polymers/elastomers suitable for the present example.

An important aspect of the present invention includes utilizing the fixture 6 with a shaped contour 62 and also having a plurality of discrete protrusions, or pins, 70 which form a plurality of cavities 74, 78, 80, which are spaced apart from one another.

The contoured surface 62 of the fixture enables not only the formation of the shaped elastomer with different thickener, but the formation of cavities 74, having different depths. Thicker elastomer and deeper cavities 78 may be disposed closer to a perimeter 84 of the shaped elastomer 54.

In accordance with the present invention, the shaped elastomer 54 can be made thicker in selected areas, for example, in a seat area 86 and a horn area 88 (see FIG. 1) by the contoured surface 62 of the fixture providing greater space between the fabric/film 12 and the contoured face 62, as shown in FIG. 5.

Thus, because of thicker elastomer and deeper cavities, these areas 86, 88 can be provided with a much greater cushioning ability than, for example, a perimeter area 90, again see FIG. 1.

The variance in cushioning capability of the shaped elastomer 54 can also be controlled by the spacing of the cavities 74 from one another.

When the cavities 74, 78, 80 are sealed, as hereinafter described, they provide for miniature compressible air columns in the elastomer. Because these air columns can be made of different length, as hereinabove described, with various spacings, the overall cushioning effect of the saddle 10 can be tailored.

In addition, to further tailor the resilient properties of the elastomer 54, and the saddle 10, the cavities 74, 78, 80 may be filled with a foam material. In addition, customized resilient properties of the saddle may be obtained by the insertion of one or more foam pads 82 (see FIG. 7). Pads 82 of various resilient end sizes can be used to customize the saddle 10 resiliency.

Figure 7:
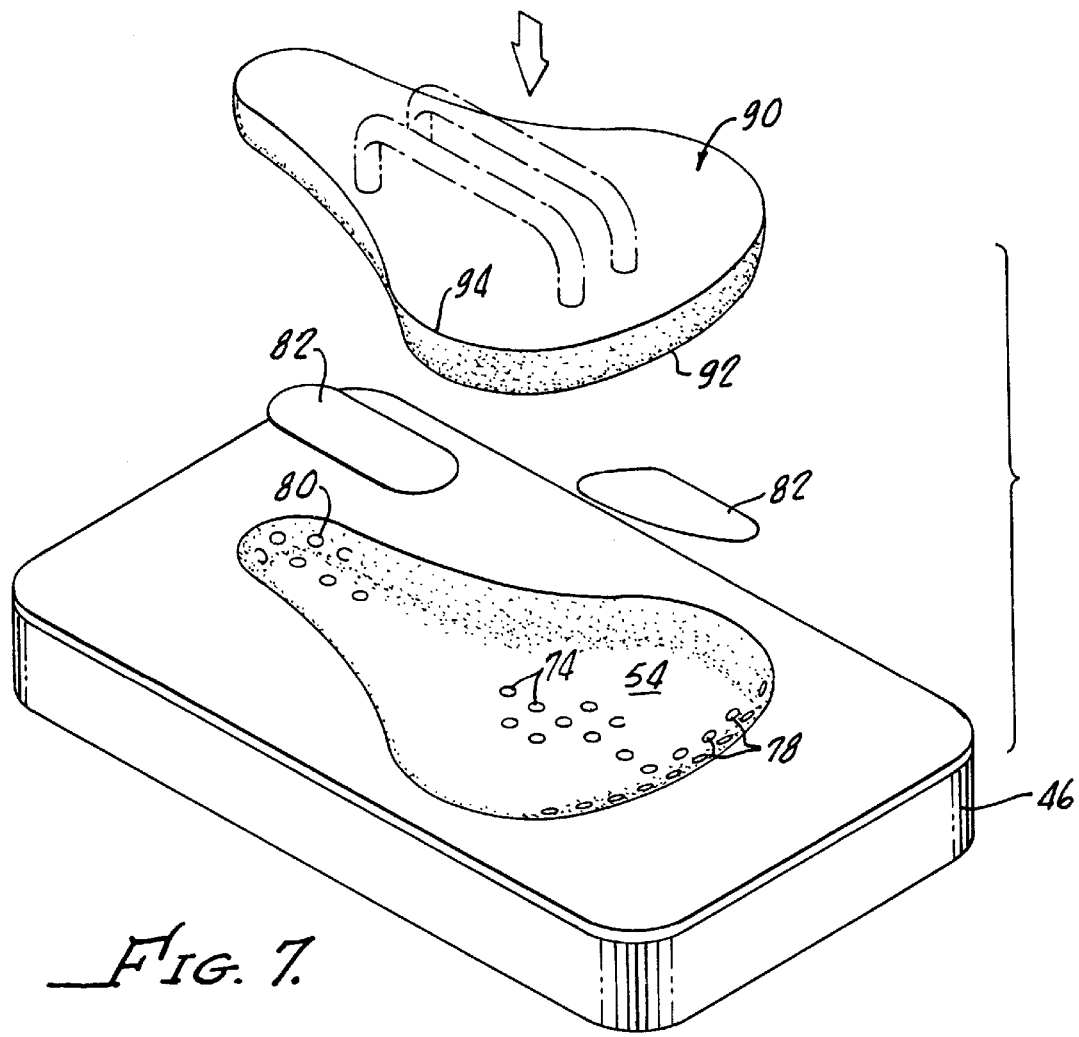
FIG. 7 is a perspective view of the fabric/film with shaped elastomer therein along with a heated shell before it is contacted with the shaped elastomer and fabric/film disposed in a mold.

With reference to FIG. 7, after removal of the fixture 60, a plastic saddle shell 90 having a surface 92 which has been heated to, for example, 150° C., may be pressed onto the shaped elastomer 54 to bond the shaped elastomers 54 to the shell surface 92 which also, of course, seals the cavities 74, 78, 80 to form the sealed air columns as hereinabove discussed.

Alternatively, the contoured fabric/film 12 with shaped elastomer 43 may be fitted to the shell 90 and adhered along a shell underside 94 without heating of the shell. This, however, does not seal the cavities 74, 78, 80 and accordingly the resiliency of the saddle is less pneumatic in nature. The fabric/film 12 may be adhered to the shell by heat sealing or the like.

A cross sectional view of the pressed engagement between the shell 90 is shown in FIG. 8. A second fixture, not shown, may be utilized to fold the fabric/film perimeter 28 as shown in dashed line, over a shell perimeter 94 in order to bond the fabric/film 12 perimeter 28 to an underside 96 of the shell 90. Thereafter, the completed saddle 10 is removed from the mold 46.

In this manner no further procedures are necessary in the formation of the completed saddle 10. For example, no separate sewing, stapling is necessary for adhering the fabric/film 12 to the shell 90 in accordance with the present invention which provides for significant economic advantage.

It should be appreciated that all of the hereinabove described procedures are automated and accordingly a little manual labor is necessary in the manufacture of the saddle in accordance with the present invention.

Although there has been hereinabove described a bicycle saddle and method of manufacturing same for the purpose of illustrating the manner in which the invention may be used to advantage, it should be appreciated that the invention is not limited thereto. Accordingly, any and all modifications, variations, and equivalent arrangements which may occur to those skilled in the art, should be considered to be within the scope of the invention as defined in the appended claims.

What is claimed is:

1. A bicycle saddle produced by the steps of:

providing a fabric/film having a selected perimeter contour;

providing a plastic film with a selected cutout portion therein;

heat sealing the plastic film to one side of the fabric/film;

disposing the fabric/film into a mold with the fabric/film perimeter surrounding a mold cavity, the cavity having a bicycle saddle contour, said plastic film facing the mold cavity;

disposing a polymer into the mold cavity and onto the fabric/film;

conforming the fabric/film to the mold cavity with the polymer to form a shaped elastomer adhering to the fabric/film in order to permanently contour the fabric/film in the shape of the bicycle saddle contour;

providing a bicycle saddle shell; and wrapping the contoured fabric/film over the shell and adhering the contoured fabric/film to an underside of the shell.

2. The bicycle saddle according to claim 1 wherein the saddle is produced by conforming the fabric/film to the mold cavity by injection of heated polymer thereinto.

3. The bicycle saddle according to claim 1 wherein the saddle is produced by conforming the fabric/film to the mold by a heated fixture.

4. The bicycle saddle according to claim 1 wherein the saddle is produced by the further steps of:

heating a shell perimeter and proximate undersurface; and folding the fabric/film perimeter over the shell perimeter to bond the fabric/film perimeter to the shell undersurface.

5. The bicycle saddle according to claim 1 wherein the saddle is produced by the further steps of:

heating a shell perimeter and proximate undersurface; and folding the fabric/film perimeter over the shell perimeter to bond the fabric/film perimeter to the shell undersurface.

6. A bicycle saddle produced by the steps of:

providing a fabric/film having a selected perimeter contour;

providing a plastic film with a selected cutout portion therein; and heat sealing the plastic film to one side of the fabric/film;

disposing the fabric/film into a mold with the fabric/film perimeter surrounding a mold cavity, the cavity having a bicycle saddle contour, said plastic film facing said mold cavity;

disposing a polymer into the mold cavity and onto the fabric/film;

conforming the fabric/film to the mold cavity with the polymer to form a shaped elastomer adhering to the fabric/film in order to permanently contour the fabric/film in the shape of the bicycle saddle contour;

providing a bicycle saddle shell;

heating a top surface of the shell to a temperature sufficient to bond the shell to the shaped elastomer; and pressing the heated shell onto the shaped elastomer to bond the shaped elastomer to the top surface of the shell.

7. The bicycle saddle according to claim 6 wherein the saddle is produced by conforming the fabric/film to the mold cavity by injection of heated polymer thereinto.

8. The bicycle saddle according to claim 6 wherein the saddle is produced by conforming the fabric/film to the mold by a heated fixture.

9. The bicycle saddle according to claim 6 wherein the saddle is produced by the further steps of:

forming a plurality of spaced apart open ended cavities in the shaped elastomer; and sealing the open ended cavities with the shell to form sealed air columns within the shaped elastomer.

10. The bicycle saddle according to claim 9 wherein the step of forming a plurality of cavities include forming cavities of different depths in order to provide greater cushioning of the saddle in selected areas.

11. The bicycle saddle according to claim 9 wherein the step of forming a plurality of cavities includes forming cavities in a spaced apart relationship in order to control cushioning properties of the saddle.

12. The bicycle saddle according to claim 11 further comprising foam disposed in said cavities.

13. The bicycle saddle according to claim 6 wherein the saddle is produced by the further steps of:

providing a transparent plastic film with a selected cutout portion therein;

providing a printed film;

disposing the printed film between the plastic films and heat sealing the films with the printed film therebetween onto the one side of the fabric/film before disposing the fabric/film into the mold with the transparent plastic film facing the mold cavity.

14. A bicycle saddle produced by the steps of:

providing a fabric/film having a selected perimeter contour;

providing a plastic film with a selected cutout portion therein;

heat sealing the plastic film to one side of the fabric/film; and wrapping the fabric/film, with the plastic film heat sealed thereto, over a bicycle saddle shell with the heat sealed plastic film covering horn and tail portions of the shell in order to provide scuff resistant areas.

15. The bicycle saddle according to claim 14 wherein the saddle is produced by the further steps of:

providing a transparent plastic film with a selected cutout portion therein;

providing a printed film;

disposing the printed film between the plastic film and the transparent plastic film and heat sealing the film onto the fabric/film before wrapping the shell with the fabric/film.

\* \* \* \* \*